Sept. 11, 1956  C. E. ADAMS ET AL  2,762,342
SERVO CONTROL MECHANISM FOR HYDRAULIC APPARATUS
Filed Sept. 4, 1952  5 Sheets-Sheet 1

INVENTORS
CECIL E. ADAMS
BY ROBERT SMILGES
Herschel C. Omohundro
attorney

Sept. 11, 1956 C. E. ADAMS ET AL 2,762,342
SERVO CONTROL MECHANISM FOR HYDRAULIC APPARATUS
Filed Sept. 4, 1952 5 Sheets-Sheet 2

INVENTORS
CECIL E. ADAMS
BY ROBERT SMILGES
Herschel C. Omohundro
attorney

Sept. 11, 1956  C. E. ADAMS ET AL  2,762,342
SERVO CONTROL MECHANISM FOR HYDRAULIC APPARATUS
Filed Sept. 4, 1952  5 Sheets-Sheet 3
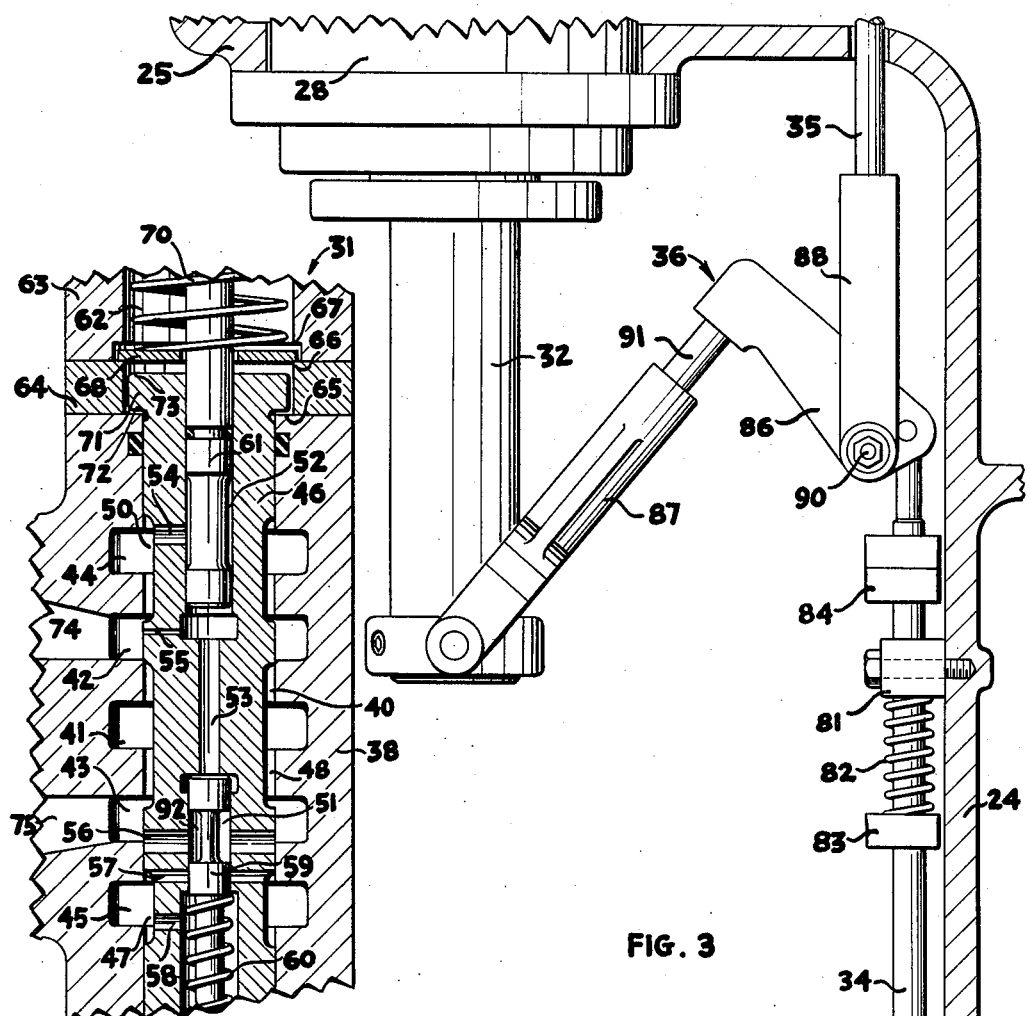
FIG. 9
FIG. 3
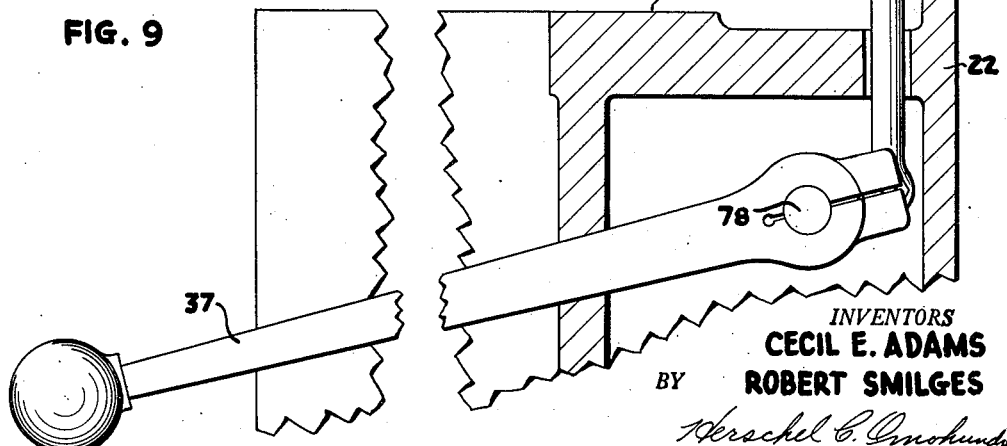
INVENTORS
CECIL E. ADAMS
ROBERT SMILGES
BY
Herschel C. Omohundro
attorney

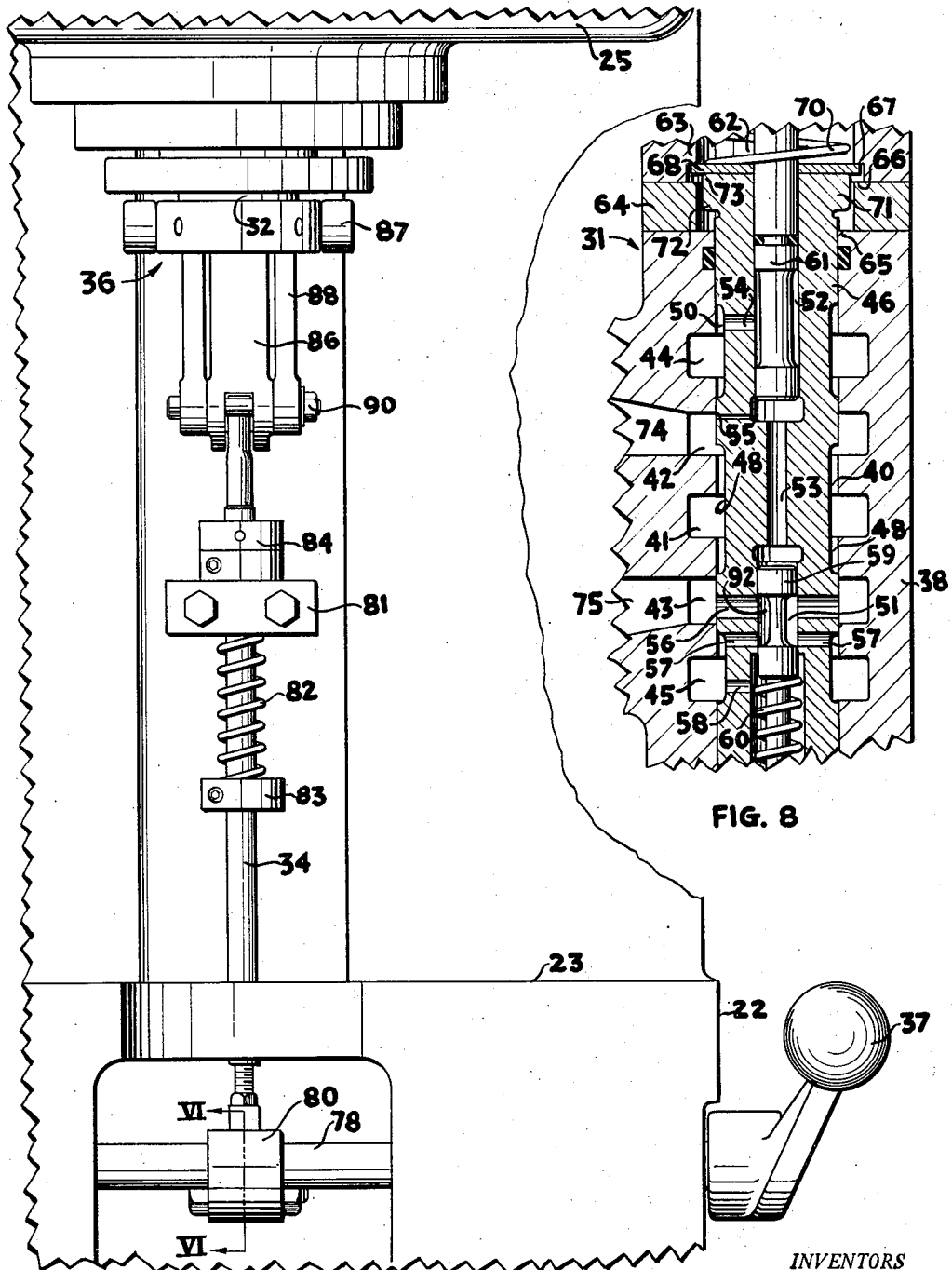

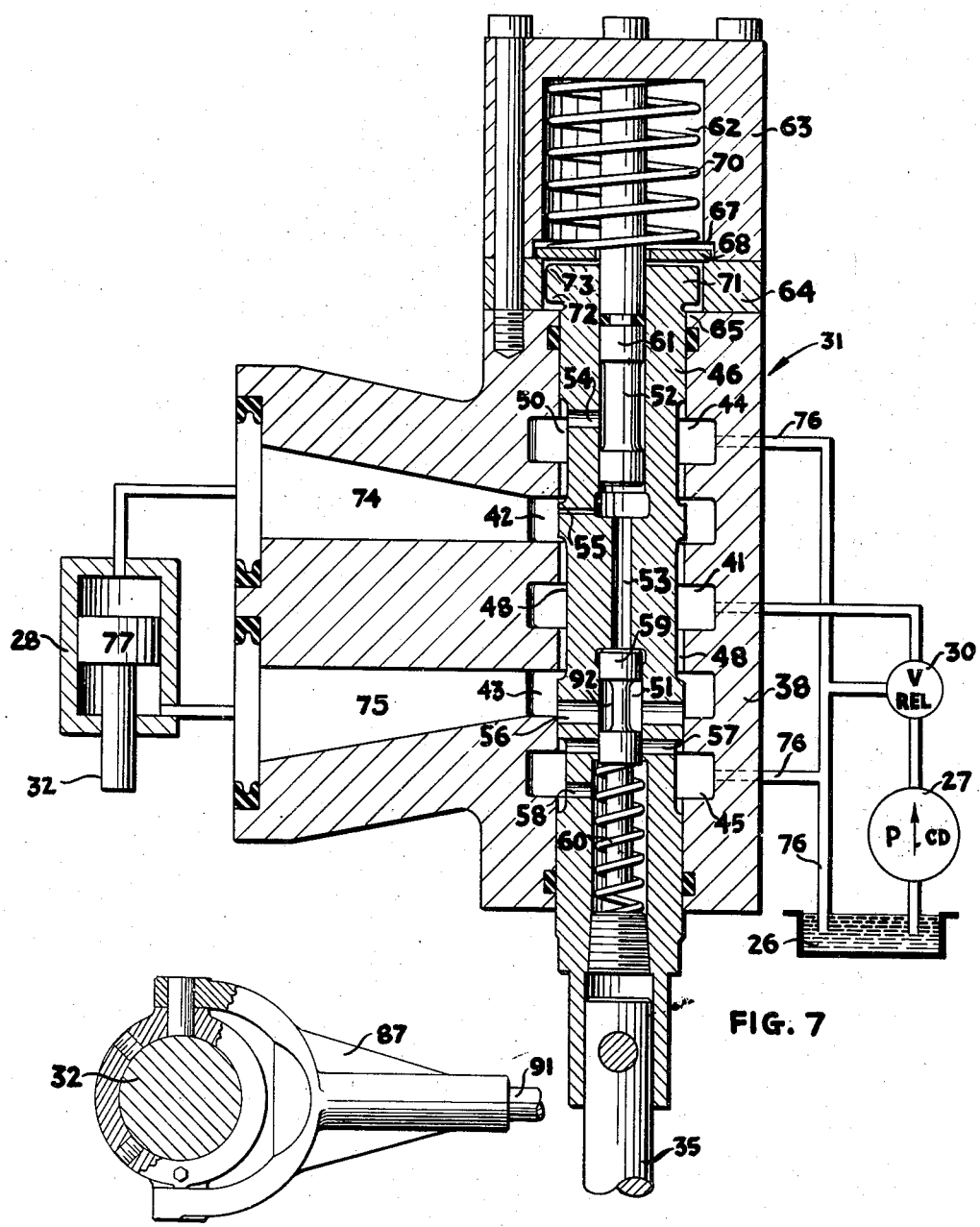

United States Patent Office 2,762,342
Patented Sept. 11, 1956

2,762,342

SERVO CONTROL MECHANISM FOR HYDRAULIC APPARATUS

Cecil E. Adams and Robert Smilges, Columbus, Ohio, assignors to The Denison Engineering Company, Columbus, Ohio Application September 4, 1952, Serial No. 307,846

8 Claims. (Cl. 121—46.5)

This invention relates generally to hydraulic apparatus and is more particularly directed to control mechanism for hydraulic apparatus having a movable element such as a ram.

An object of this invention is to provide an improvement in control mechanism particularly of the type shown in Patent No. 2,580,062, issued December 25, 1951, to Cecil Adams et al.

Another object is to provide a control mechanism which is extremely sensitive in character whereby the operator can sense the force being exerted by a hydraulic ram through a resistance applied to the control mechanism manipulated by the operator.

A further object of the invention is to provide a control mechanism for a hydraulic ram which will cause the ram to rapidly approach the work and, after engaging the same, move at a slower rate but with increased force.

Another object is to provide a control mechanism of the type commonly referred to as a servo control, which mechanism has an improved valve provided with means for resisting further movement of a movable element of the valve following its movement a predetermined distance in a certain direction, the valve being further provided with means for applying fluid pressure to the movable element to impart force thereto which will be imparted to the operator through his sense of feeling and thus indicating the force exerted by the fluid motor.

Further objects and advantages of the present invention will be apparent from the following description, reference being had to the accompanying drawings wherein a preferred form of embodiment of the invention is clearly shown.

In the drawings:

Fig. 3 is a similar view showing the same portions of the mechanism operatively positioned with the ram of the press projected;

Fig. 4 is a front elevational view of the portions of the control mechanism shown in Figs. 2 and 3 with the press ram retracted;

Fig. 5 is a horizontal sectional view taken through the ram and a portion of the control mechanism on the plane indicated by the line V—V of Fig. 2;

Fig. 7 is a diagrammatic view of the hydraulic system employed in the press shown in Fig. 1, the control valve incorporated in the system being shown in section with the movable parts in position to cause the press to remain idle;

Figure 1:
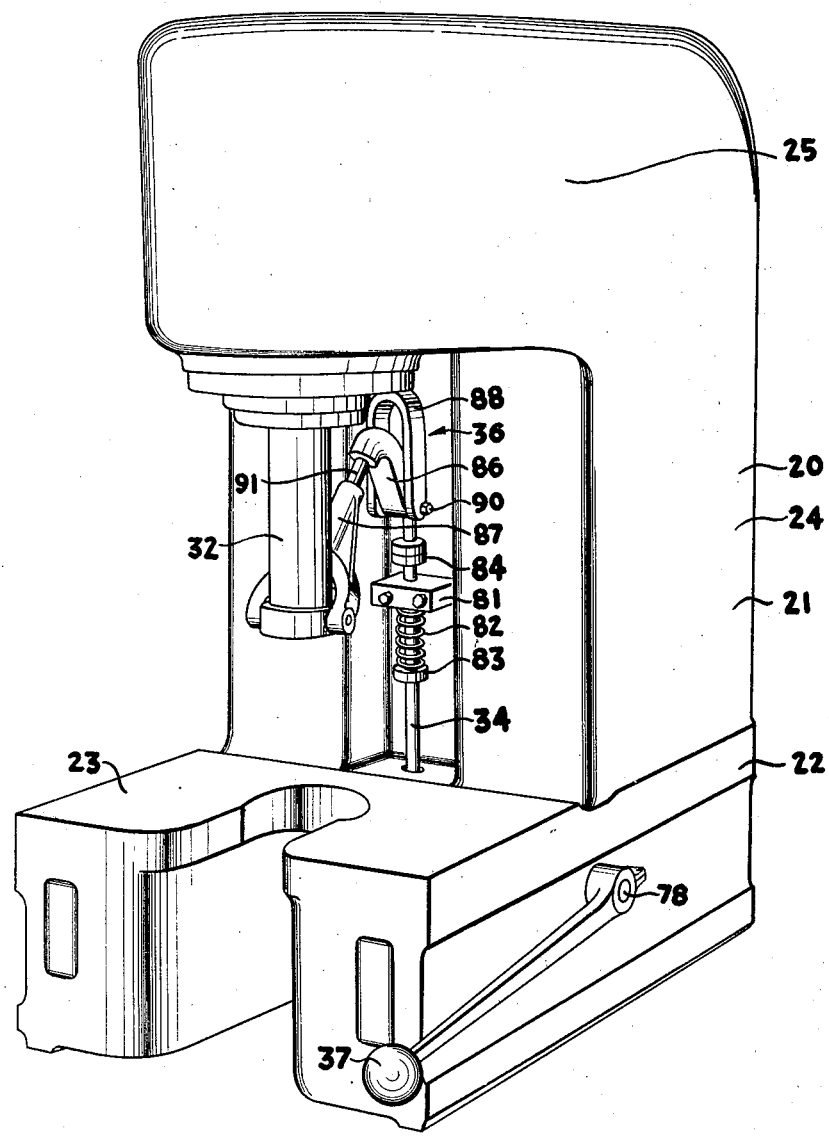
Fig. 1 is a perspective view of a hydraulically operated bench press provided with control mechanism embodying the present invention.
Figures 6, 10:
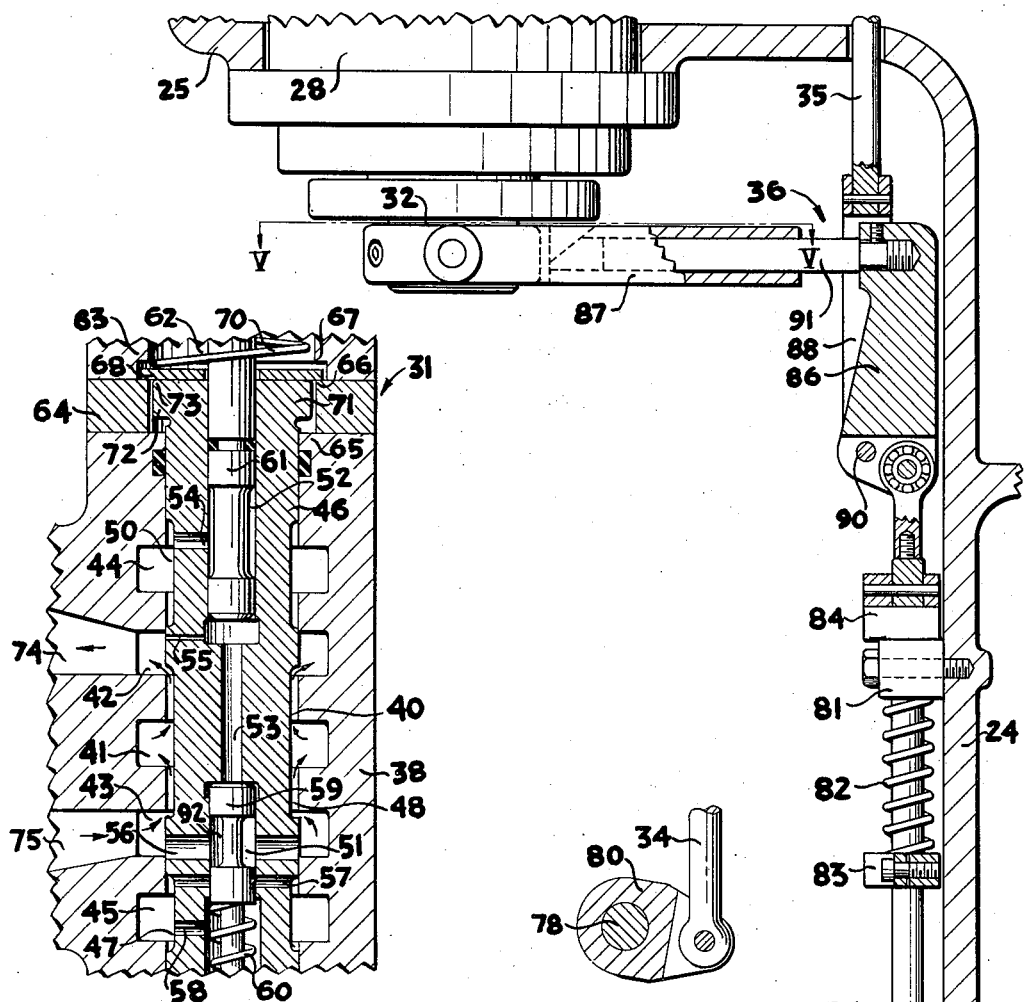
Fig. 6 is a detail sectional view taken through a portion of the push rod and crank connections forming a part of the control mechanism, the plane of the section being indicated by the line VI—VI of Fig. 4.

Figs. 8, 9, and 10 are sectional views of the control valve showing the movable parts in other positions of operation.

Referring more particularly to the drawings, numeral 20 designates a press provided with a control mechanism formed in accordance with the present invention. The press 20 includes a frame 21 having a base section 22, the forward end of which constitutes a work receiving platen 23. From the rear end of the base section 22, a back section or column 24 extends upwardly and has a forwardly projecting head portion 25 at its upper end, this section projecting over the platen 23. The frame 21 receives a reservoir 26, shown only in the diagrammatic view in Fig. 7, a motor driven pump 27 and a power cylinder 28, the latter being disposed in the head section 25 of the frame, over the platen 23. Suitable conduits extend from the reservoir to the pump, from the latter to a relief valve 30, and from the latter to a control valve 31 forming a part of the control mechanism. This valve constitutes a reversing valve and is employed to govern the flow of fluid to the power cylinder 28 to effect the operation of a ram 32 forming a part of the power cylinder. All the parts of the hydraulic system, with the exception of the control valve 31, are substantially conventional in character and will not be described in detail herein, the only description thereof given here being that necessary to facilitate an understanding of the control mechanism.

The control mechanism includes the valve 31, a sectional shipper or push rod 34 and 35, coupling means, designated generally by the numeral 36, an operating lever or manual 37 and means connecting these elements. The control valve 31 includes a casing 38 having a longitudinally extending bore 40 and a plurality of annular grooves 41 to 45, inclusive, spaced longitudinally thereof. These grooves constitute inlet, forward and reverse motor and exhaust grooves or ports 41, 42, 43, 44, and 45, respectively. The inlet port 41 is connected with the relief valve and through this member to the pump 27 and receives fluid from the pump.

The bore 40 receives a spool 46 which is employed to establish communication between certain sets of the ports 41 to 45, inclusive, depending upon the position of the spool in the bore. The spool is shown in various positions in Figs. 7, 8, 9, and 10. The spool 46 is provided with longitudinally spaced external annular grooves 47, 48, and 50 and spaced lands, the grooves serving to establish the communication between the grooves in the casing. The spool is also provided with internal chambers 51 and 52 which are connected by a longitudinal passage 53. Chamber 52 is connected by a laterally extending passage 54 with the external groove 50. A second lateral passage 55 of reduced size extends from the lower portion of the chamber 52 to the exterior of the spool 46 between the grooves 48 and 50. A plurality of lateral passages 56, 57, and 58 extend from the chamber 51 to the exterior of the spool 46, passages 56 being disposed between grooves 47 and 48 while passages 57 and 58 register and communicate with groove 47. The chamber 51 is provided for the slidable reception of a reduced spool or plunger 59, this plunger being urged toward a predetermined position in the chamber 51 by a coil spring 60. Chamber 52 also receives a plunger or piston 61 which is slidable in the chamber 52, one end of this plunger or piston projecting beyond the upper end of spool 46 into a chamber 62 provided by a cover 63 for the open upper end of the valve body 38.

In the present instance, the cover 63 is spaced from the body 38 by a member 64 which has an opening registering with the bore 40 but of larger diameter than such bore to provide a shoulder 65 at the upper end of the casing 40. The member 64 also forms a shoulder 66 at its upper end, this shoulder being opposed to and spaced from a shoulder 67 formed in the cap 63. The space between the shoulders 66 and 67 receives a washer 68 which is urged in a downward direction against the shoulder 66 by a coil spring 70. The valve spool 46 has a head 71 at the upper end thereof, which head provides shoulders 72 and 73 for engagement with shoulder 65 on the body and washer 68. The work ports or motor ports 42 and 43 are connected by passages 74 and 75 with the upper and lower ends of the power cylinder 28. Fluid passages 76 lead from the exhaust ports 44 and 45 to the reservoir 26.

When the spool 46 is disposed in the position shown in Fig. 7, the piston 77 of the power cylinder will be maintained in an idle or stationary position. In this position of the spool, the grooves 48 and 50 are connected and fluid supplied by the pump 27 to the groove 41 will be conducted by grooves 48, 42, 50, and 44 to exhaust. Since groove 48 also communicates with groove 43, both sides of the piston 77 of the power cylinder 28 will be exposed to the pressure of the fluid from the pump and the fluid will, therefore, exert no force on the piston 77 of the power cylinder to cause it to move. When it is desired, however, to cause the piston 77 and ram 32 to move, the spool 46 will be moved in a predetermined direction or to a predetermined position in which certain ports in the body 38 are in communication. Movement of the spool 46 is effected through the actuation of the operating lever 37.

Lever 37 is fixed to one end of a rock shaft 78 which extends transversely through and is journaled in the base 22 of the frame 21. At its central portion, the rock shaft 78 is provided with a crank extension 80 to which the lower end of the push rod section 34 is pivotally secured. This section 34 of the push rod extends upwardly through the upper wall of the base section 22 and through a guide 81 fixed to the front face of the column 24. Spring means 82 are disposed between the guide 81 and a collar 83 secured to the push rod 34, the spring tending to push the rod downwardly and rock the shaft 78 in a clockwise direction causing the forward end of the operating lever 37 to move in an upward direction. Above the guide 81, the push rod 34 is provided with a second collar 84 for engaging the upper side of the guide 81 and limiting the downward movement of the rod section 34.

Figure 2:
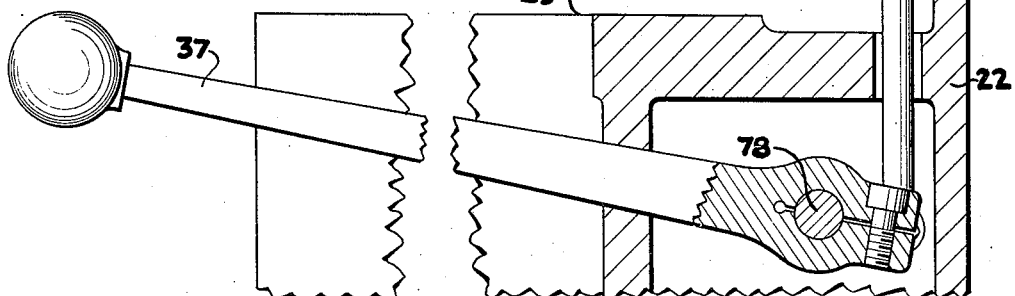
Fig. 2 is a vertical sectional view with parts in elevation showing portions of the control mechanism in idle condition with the ram of the press fully retracted.

Rod section 34 is connected at its upper end to the coupling device, designated generally by the numeral 36, this device including a plurality of parts 86 to 88, inclusive. Part 86 will be designated as a clevis since it is provided with spaced ears between which the upper end of the rod 34 is pivoted. This clevis 86 is also pivotally connected as at 90 to the lower end of a fork 88 which also forms a part of the coupling 36, this fork 88 being secured to the lower end of push rod section 35, the upper end of which is rigidly connected with the lower end of the valve spool 46 (see Fig. 7). The clevis 86 has a forwardly extending projection 91 which is telescopically received by a forked arm 87 which constitutes the third part of the coupling 36. The arm 87 is forked at its forward end to receive the lower end of the ram 32, the arm being pivotally connected to the ram. The parts of the coupling 34, the sectional push rod 34, 35 and the operating lever 37 are shown in different positions in Figs. 2 and 3 of the drawings. When the ram 32 is in its retracted position, the parts will be disposed as shown in Fig. 2. If it is desired to advance the ram 32, the forward end of the lever 37 is depressed. This causes the push rod sections 34 and 35 to be moved in an upward direction transmitting similar movement to the spool 46 of the valve 31.

As the spool 46 moves upwardly, the shoulder or land on spool 46 at the lower end of the groove 50 in spool 46 moves toward the shoulder in the valve body 38 located at the upper end of groove 42; the flow of fluid from groove 41 to exhaust port 44 will thus be restricted and fluid under pressure will then be directed to the upper end of the power cylinder 28. Fluid admitted in this manner to the power cylinder 28 will exert force on the upper surface of the piston 77 causing such piston to move in a downward direction. As the piston 77 so moves, fluid beneath it and within the cylinder 28 will be discharged from the latter through passage 75 to groove 43 in the valve casing 38. Since the lower end of groove 48 in the valve spool 46 still communicates with groove 43 in the casing, fluid exhausted from the lower end of the power cylinder 28 will be directed by the groove 48 to grooves 41 and 42, the latter of which is connected by passage 74 with the upper end of the power cylinder 28. Thus, fluid discharged from the lower end of the power cylinder will be combined with fluid flowing from the pump to the upper end of the power cylinder and will cause the piston and ram to move at a more rapid rate than if only fluid supplied by the pump were used. This fact will be obvious from an inspection of Fig. 7 of the drawing wherein it will be observed that, by combining the exhaust from the lower end of the power cylinder 28 with fluid from the pump 27, the effective area of the piston 77 will be reduced to the cross-sectional area of the ram 32.

Stated another way, the power cylinder 28 is an unbalanced reciprocatory type cylinder and piston motor and if equal hydraulic pressures are applied to the top and to the bottom of its piston 77, then hydraulic pressure applied to the effective area of the bottom of said piston 77 will neutralize or balance out the hydraulic pressure applied to an equal area on the top of said piston 77. Since hydraulic pressure is not applied to the bottom of said piston 77 throughout the cross-sectional area of the piston rod or cam 32, then the effective area of the top of piston 77 will be equal to the cross-sectional area of the ram 32 and said piston 77 and ram 32 will be moved downwardly, as seen in Fig. 7 of the drawings, and such movement will displace fluid from below the piston 77 through the valve 31 to the top of said piston 77, additional hydraulic fluid under pressure, is, of course, supplied to the top of piston 77 by pump 27 to cause said movement.

As the ram 32 moves in a downward direction, motion will be transmitted to the coupling 36 due to the connection of the arm 84 with the ram. This downward motion of the outer end of the arm 84 causes the coupling to pivot about the connection of push rod section 34 therewith, the pivotal movement causing the push rod section 35 to move in a downward direction. This push rod section transmits such movement to the valve spool 46 causing the groove 50 therein to again establish communication between groove 42 and exhaust groove 44. It should be understood that the movement of the ram 32 in a downward direction occurs substantially simultaneously with the movement of the operating lever 37 and the movement of the valve spool 46 by the ram 32 occurs as the ram moves. Therefore, the ram movement is under the direct control of the operator and he must continue to move the lever 37 downward if he wishes the ram to continue its downward movement. The operator can interrupt the movement of the ram merely by discontinuing the movement of the operating lever 37.

If it is desired to retract the ram 32, the operating lever 37 is moved in an upward direction which will cause the valve spool 46 to move downwardly until the shoulder at the upper end of groove 48 substantially meets the lower shoulder of groove 42 as shown in Fig. 9. When this position is approached, substantially all of the fluid supplied by the pump through groove 41 will be directed to the lower end of the power cylinder 28 and fluid discharged from the upper end thereof will be directed to exhaust. During the retraction of the ram 32, the coupling 36 will transmit reverse movement to the valve spool 46. In other words, it will cause the valve spool 46 to move in an upward direction to interrupt the flow of fluid to the lower end of the power cylinder 28 and to direct fluid from the pump 27 to exhaust. It will be obvious that the retractive movement of the ram 32 is under the direct control of the operator in the same manner as the advancing movement thereof. The coupling member 36, being attached to the ram, serves to directly connect the push rod sections when the ram is stationary and transmits movement of the operating lever to the spool of the control valve. When the ram moves, however, the coupling device causes a reduction in the effective length of the push rod 34, 35 and permits the valve spool 46 to move in the opposite direction from that in which it was moved by the operating lever 37.

When the valve spool 46 occupies the position shown in Fig. 10, the ram 32 of the power cylinder 28 will not exert full force due to the reduction in the effective area of the piston 77. After the ram 32 engages the work, the rate of movement of the ram will decrease due to the resistance offered by the work. If the operator continues to push the lever 37 in a downward direction, the valve spool 46 will be disposed in position to direct fluid to the upper end of the power cylinder. By selecting the lowered position of the lever 37, the operator may regulate the force exerted on the work by the ram. For example, if the lever 37 is manipulated to move the spool 46 to a position wherein groove 42 is no longer connected with groove 44 by groove 50 but grooves 42 and 43 are connected with groove 41 by spool groove 48, and the advancement of the ram is resisted sufficiently to create a pressure on the fluid in the groove 42, and passages connected therewith, great enough, this pressure will be transmitted through passages 55 and 53 to the upper end of spool 59. This pressure will cause the spool 59 to be depressed in opposition to the spring 60 to a position in which groove 92 in spool 59 establishes communication between passages 56 and 57 and some of the fluid from the pump will be by-passed to the reservoir. The quantity of fluid by-passed will determine the pressure built up in the system and, consequently, the force or tonnage exerted by the ram 32. If the spool 46 is moved upwardly enough to interrupt communication between grooves 43 and 48, the fluid pressure will increase until the relief valve 30 by-passes the excess fluid from the pump 27 to the reservoir 26. The ram will then be exerting the maximum tonnage for which the relief valve 30 has been adjusted. The operation of the relief valve 30 will only take place if the ram 32 ceases to move. If movement of the ram 32 continues after the spool 59 is depressed, the exhaust from the lower end of the power cylinder 28 will flow through passage 56, groove 92, passage 57, and groove 45 to exhaust. At this time, the spool 46 will be in the position shown in Fig. 8 in which the groove 50 will no longer communicate with the groove 42. Neither will the groove 48 communicate with the groove 43. All of the fluid then flowing to groove 41 from the pump 27 will be directed to the upper end of the power cylinder 28 and will exert its force over the entire upper area of the piston 77 in the power cylinder.

Port 58 in spool 46 permits the displacement of fluid from the lower end of chamber 51 when spool 59 is depressed. The complete or maximum tonnage for which the relief valve 30 has been adjusted will be developed by the power cylinder when the fluid pressure in the upper end of the power cylinder and the passages connected therewith increases sufficiently to cause the operation of the relief valve 30.

After the desired work-pressing operation has been completed, the ram 32 may be retracted by releasing the operating lever 37 or raising the forward end thereof. This movement of the operating lever 37 will place the spool 46 in the position shown in Fig. 9 wherein the fluid pressure source will be connected with the lower end of the power cylinder through grooves 41, 48, 43, and passage 75. The ram 32 will then be retracted in the manner previously set forth.

It is important to note that, during the advancement of the ram, the same fluid pressure existing in the upper end of the power cylinder will also be transmitted through the passage 55 to the chamber 52 and will be applied to the upwardly facing internal surfaces of the spool 46. This fluid pressure will tend to move the spool 46 in a downward direction in opposition to the force exerted by the operator on the operating lever 37. The operator will thus be apprised, through his sense of feeling, of the force being exerted by the ram on the work. He will also be made conscious of this force through the resistance offered by the spring 70 to the movement of the spool 46 after the spool has engaged the washer 68. Through the provision of the spring 70 and the washer 68, the operator will be required to exert additional force to cause the full volume of fluid from the pressure source to be directed to the power cylinder. This feature, together with the application of fluid pressure to the spool 46 of the valve, provides an indication of the force being exerted by the ram. After a short training period, a new operator may perform the desired operations with the same facility as a skilled operator.

While the form of embodiment of the present invention as herein disclosed constitutes a preferred form, it is to be understood that other forms might be adopted, all coming within the scope of the claims which follow.

We claim:

1. A valve particularly adapted to control the operation of an unbalanced hydraulic cylinder and piston type motor, said valve including means forming a housing having a bore; a plurality of spaced port means associated with said bore including a pair of motor ports adapted to be connected to opposite ends of said motor, a supply port and a pair of exhaust ports; a spool in said bore having spaced lands and grooves, said lands and grooves interconnecting said motor ports and one of said exhaust ports when said spool is in one position in said bore, one of said lands functioning to restrict communication between and then isolate said motor ports and said one exhaust port when said spool is moved in one direction from said one position, said spool having an axial bore; a piston attached to said housing and extending into said axial bore; means in said spool forming a passageway leading from one of said motor ports to said axial bore for admitting fluid under pressure into the latter; means in said axial bore adapted to cooperate with said piston whereby fluid under pressure admitted from said one motor port into said axial bore tends to urge said spool toward said one position and whereby the pressure of the fluid within said axial bore will increase progressively as said spool is moved in a direction to restrict communication between and then isolate said motor ports and said one exhaust port; and means forming a relief valve in said spool responsive to the pressure of fluid in the said bore thereof to connect the second of said motor ports with the second of said exhaust ports.

2. A valve particularly adapted to control the operation of an unbalanced hydraulic cylinder and piston type motor, said valve including means forming a housing having a bore; a plurality of spaced port means associated with said bore including a pair of motor ports adapted to be connected to opposite ends of said motor, a supply port and a pair of exhaust ports; a spool in said bore having spaced lands and grooves, said lands and grooves interconnecting said motor ports and one of said exhaust ports when said spool is in one position in said bore, one of said lands functioning to restrict communication between and then isolate said motor ports and said one exhaust port when said spool is moved in one direction from said one position, said spool having an axial bore; a piston attached to said housing and extending into said axial bore; means in said spool forming a passageway leading from one of said motor ports to said axial bore for admitting fluid under pressure into the latter; means in said axial bore adapted to cooperate with said piston whereby fluid under pressure admitted from said one motor port into said axial bore tends to urge said spool toward said one position and whereby the pressure of the fluid within said axial bore will increase progressively as said spool is moved in a direction to restrict communication between and then isolate said motor ports and said one exhaust port; and relief valve means responsive to the pressure of fluid in said one motor port to connect the other of said motor ports to the other of said exhaust ports.

3. A valve particularly adapted to control the operation of an unbalanced hydraulic cylinder and piston type motor, said valve including means forming a housing having a bore; a plurality of spaced port means associated with said bore including a pair of motor ports adapted to be connected to opposite ends of said motor, a supply port and a pair of exhaust ports; a spool in said bore having spaced lands and grooves, said lands and grooves interconnecting said motor ports and one of said exhaust ports when said spool is in one position in said bore, one of said lands functioning to restrict communication between and then isolate said motor ports and said one exhaust port when said spool is moved in one direction from said one position, said spool having an axial bore; a piston attached to said housing and extending into said axial bore; means in said spool forming a passageway leading from one of said motor ports to said axial bore for admitting fluid under pressure into the latter; means in said axial bore adapted to cooperate with said piston whereby fluid under pressure admitted from said one motor port into said axial bore tends to urge said spool toward said one position and whereby thep ressure of the fluid within said axial bore will increase pogessively as said spool is moved in a direction to restrict communication between and then isolate said motor ports and said one exhaust port; and valve means adapted to connect the other of said motor ports to the other of said exhaust ports.

4. A valve particularly adapted to control the operation of an unbalanced hydraulic cylinder and piston type motor, said valve including means forming a housing having a bore; a plurality of spaced port means associated with said bore including a pair of motor ports adapted to be connected to opposite ends of said motor, a supply port and a pair of exhaust ports; a spool in said bore having spaced lands and grooves, said lands and grooves interconnecting said motor ports and one of said exhaust ports when said spool is in one position in said bore, one of said lands functioning to restrict communication between and then isolate said motor ports and said one exhaust port when said spool is moved in one direction from said one position, said spool having an axial bore; means in said spool forming a passageway leading from one of said motor ports to said axial bore for admitting fluid under pressure into the latter; means in said axial bore responsive to the pressure of the fluid admitted thereto tending to urge said spool toward said one position and whereby the pressure of the fluid within said axial bore will increase progressively as said spool is moved in a direction to restrict communication between and then isolate said motor ports and said one exhaust port; and means forming a relief valve in said spool responsive to the pressure of fluid in the said bore thereof to connect the second of said motor ports with the second of said exhaust ports.

5. A valve particularly adapted to control the operation of an unbalanced hydraulic cylinder and piston type motor, said valve including means forming a housing having a bore; a plurality of spaced port means associated with said bore including a pair of motor ports adapted to be connected to opposite ends of said motor, a supply port and a pair of exhaust ports; a spool in said bore having spaced lands and grooves, said lands and grooves interconnecting said motor ports and one of said exhaust ports when said spool is in one position in said bore, one of said lands functioning to restrict communication between and then isolate said motor ports and said one exhaust port when said spool is moved in one direction from said one position, said spool having an axial bore; means in said spool forming a passageway leading from one of said motor ports to said axial bore for admitting fluid under pressure into the latter; means in said axial bore responsive to the pressure of the fluid admitted thereto tending to urge said spool toward said one position and whereby the pressure of the fluid within said axial bore will increase progressively as said spool is moved in a direction to restrict communication between and then isolate said motor ports and said one exhaust port; and relief valve means responsive to the pressure of fluid in said one motor port to connect the other of said motor ports to the other of said exhaust ports.

6. A valve particularly adapted to control the operation of an unbalanced hydraulic cylinder and piston type motor, said valve including means forming a housing having a bore; a plurality of spaced port means associated with said bore including a pair of motor ports adapted to be connected to opposite ends of said motor, a supply port and a pair of exhaust ports; a spool in said bore having spaced lands and grooves, said lands and grooves interconnecting said motor ports and one of said exhaust ports when said spool is in one position in said bore, one of said lands functioning to restrict communication between and then isolate said motor ports and said one exhaust port when said spool is moved in one direction from said one position, said spool having an axial bore; means in said spool forming a passageway leading from one of said motor ports to said axial bore for admitting fluid under pressure into the latter; means in said axial bore responsive to the pressure of the fluid admitted thereto tending to urge said spool toward said one position and whereby the pressure of the fluid within said axial bore will increase progressively as said spool is moved in a direction to restrict communication between and then isolate said motor ports and said one exhaust port; and valve means adapted to connect the other of said motor ports to the other of said exhaust ports.

7. A valve particularly adapted to control the operation of an unbalanced hydraulic cylinder and piston type motor, said valve including means forming a housing having a bore; a plurality of spaced port means associated with said bore including a pair of motor ports adapted to be connected to opposite ends of said motor, a supply port and an exhaust port; a spool in said bore having spaced lands and grooves, said lands and grooves interconnecting said motor ports and said exhaust port when said spool is in one position in said bore, one of said lands functioning to restrict communication between and then isolate said motor ports and said exhaust port when said spool is moved in one direction from said one position, said spool having an axial bore; a piston attached to said housing and extending into said axial bore; means in said spool forming a passageway leading from one of said motor ports to said axial bore for admitting fluid under pressure into the latter; and means in said axial bore adapted to cooperate with said piston whereby fluid under pressure admitted from said one motor port into said axial bore tends to urge said spool toward said one position and whereby the pressure of the fluid within said axial bore will increase progressively as said spool is moved in a direction to restrict communication between and then to isolate said motor ports from said exhaust port.

8. A valve particularly adapted to control the operation of an unbalanced hydraulic cylinder and piston type motor, said valve including means forming a housing having a bore; a plurality of spaced port means associated with said bore including a pair of motor ports adapted to be connected to opposite ends of said motor, a supply port and an exhaust port; a spool in said bore having spaced lands and grooves, said lands and grooves interconnecting said motor ports and said exhaust port when said spool is in one position in said bore, one of said lands functioning to restrict communication between and then isolate said motor ports and said exhaust port when said spool is moved in one direction from said one position, said spool having an axial bore; means in said spool forming a passageway leading from one of said motor ports to said axial bore for admitting fluid under pressure into the latter; and means in said axial bore responsive to the pressure of the fluid admitted thereto tending to urge said spool toward said one position and whereby the pressure of the fluid within said axial bore will increase progressively as said spool is moved in a direction to restrict communication between and then to isolate said motor ports from said exhaust port.

References Cited in the file of this patent

UNITED STATES PATENTS

| | | |
|---|---|---|
| 756,831 | Clarke | Apr. 12, 1904 |
| 1,068,243 | Iversen | July 22, 1913 |
| 2,000,270 | Andrews et al. | May 7, 1935 |
| 2,293,059 | Hirvonen | Aug. 18, 1942 |
| 2,346,214 | Flowers | Apr. 11, 1944 |
| 2,368,017 | Grad | Jan. 23, 1945 |
| 2,370,137 | Biggert | Feb. 27, 1945 |
| 2,502,800 | Renick | Apr. 4, 1950 |
| 2,516,449 | Coates | July 25, 1950 |
| 2,536,965 | Taylor | Jan. 2, 1951 |
| 2,596,242 | Hill | May 13, 1952 |
| 2,608,263 | Garrison | Aug. 26, 1952 |

FOREIGN PATENTS

| | | |
|---|---|---|
| 872,763 | France | Feb. 23, 1942 |